United States Patent
Juntunen et al.

(10) Patent No.: US 7,161,782 B2
(45) Date of Patent: Jan. 9, 2007

(54) INTELLIGENT FUSE BOX FOR THE POWER DISTRIBUTION SYSTEM OF A VEHICLE

(75) Inventors: Asko Juntunen, Oulu (FI); Lauri Lamberg, Hyvinkää (FI)

(73) Assignee: IWS International Oy, Oulu (FI)

( * ) Notice: Subject to any disclaimer, the term of this patent is extended or adjusted under 35 U.S.C. 154(b) by 342 days.

(21) Appl. No.: 10/451,480

(22) PCT Filed: Dec. 21, 2001

(86) PCT No.: PCT/FI01/01144

§ 371 (c)(1),
(2), (4) Date: Jun. 18, 2003

(87) PCT Pub. No.: WO02/051668

PCT Pub. Date: Jul. 4, 2002

(65) Prior Publication Data

US 2004/0052024 A1    Mar. 18, 2004

(30) Foreign Application Priority Data

Dec. 22, 2000  (FI) .............................. 20002834

(51) Int. Cl.
*H02H 3/08* (2006.01)
*H02H 9/02* (2006.01)
*H02H 7/18* (2006.01)

(52) U.S. Cl. .................. 361/93.2; 361/93.9; 361/98; 361/104; 307/10.7

(58) Field of Classification Search .............. 361/93.2, 361/94, 98, 93.9, 104; 307/10.7
See application file for complete search history.

(56) References Cited

U.S. PATENT DOCUMENTS

| | | | | |
|---|---|---|---|---|
| 3,643,151 A | * | 2/1972 | Matsushima et al. | 323/277 |
| 4,575,673 A | * | 3/1986 | Tedeschi et al. | 323/351 |
| 4,845,708 A | * | 7/1989 | Herrmann et al. | 370/386 |
| 4,916,698 A | * | 4/1990 | McCann | 714/55 |
| 5,040,990 A | * | 8/1991 | Suman et al. | 439/34 |

(Continued)

FOREIGN PATENT DOCUMENTS

DE    EP0252541    *    1/1988

(Continued)

*Primary Examiner*—Brian Sircus
*Assistant Examiner*—Z Kitov
(74) *Attorney, Agent, or Firm*—Davidson, Davidson & Kappel, LLC

(57) ABSTRACT

The present invention relates to intelligent fuse box (1) for a vehicle's multiplex power distribution system, the fuse box including outputs (3) for driving the vehicle's functional components/actuators and/or cable buses (11–13) equipped with intelligent_nodes (14), the latter in turn having outputs for driving functional components/actuators (15), and further including means serving fuse functions between the outputs (3; 11–13) and the vehicle's power supply bus (12). The fuse-function means are controlled solid-state switches (4). The fuse box (1) includes inputs (5) for receiving messages controlling the ON/OFF state of solid-state switches (4) and a microprocessor (6), the latter controlling the solid-state switches (4) based on a program stored in the microprocessor memory (7) and on current limits predetermined in configuration data (8). In addition to the actual fuse functions, the controlled operation of the solid-state switches offer a plurality of auxiliary functions such as rush current limiting, programmable reconfiguration of current limits, dynamic fuse functions (e.g., to implement a low-current Asleep mode in a parked vehicle) and measurement of system overall load current.

7 Claims, 1 Drawing Sheet

U.S. PATENT DOCUMENTS

| | | | |
|---|---|---|---|
| 5,853,020 A * | 12/1998 | Widner | 137/227 |
| 5,925,998 A * | 7/1999 | Olson | 318/484 |
| 6,011,413 A * | 1/2000 | Hayakawa et al. | 327/51 |
| 6,157,091 A | 12/2000 | Yoshida et al. | |
| 6,182,807 B1 * | 2/2001 | Saito et al. | 191/2 |
| 6,226,305 B1 * | 5/2001 | McLoughlin et al. | 370/532 |
| 6,404,157 B1 * | 6/2002 | Simon | 318/445 |

FOREIGN PATENT DOCUMENTS

| | | |
|---|---|---|
| EP | 0812049 A1 | 12/1997 |
| EP | 0529650 B1 | 3/1999 |
| JP | 10-042481 | 2/1998 |

* cited by examiner

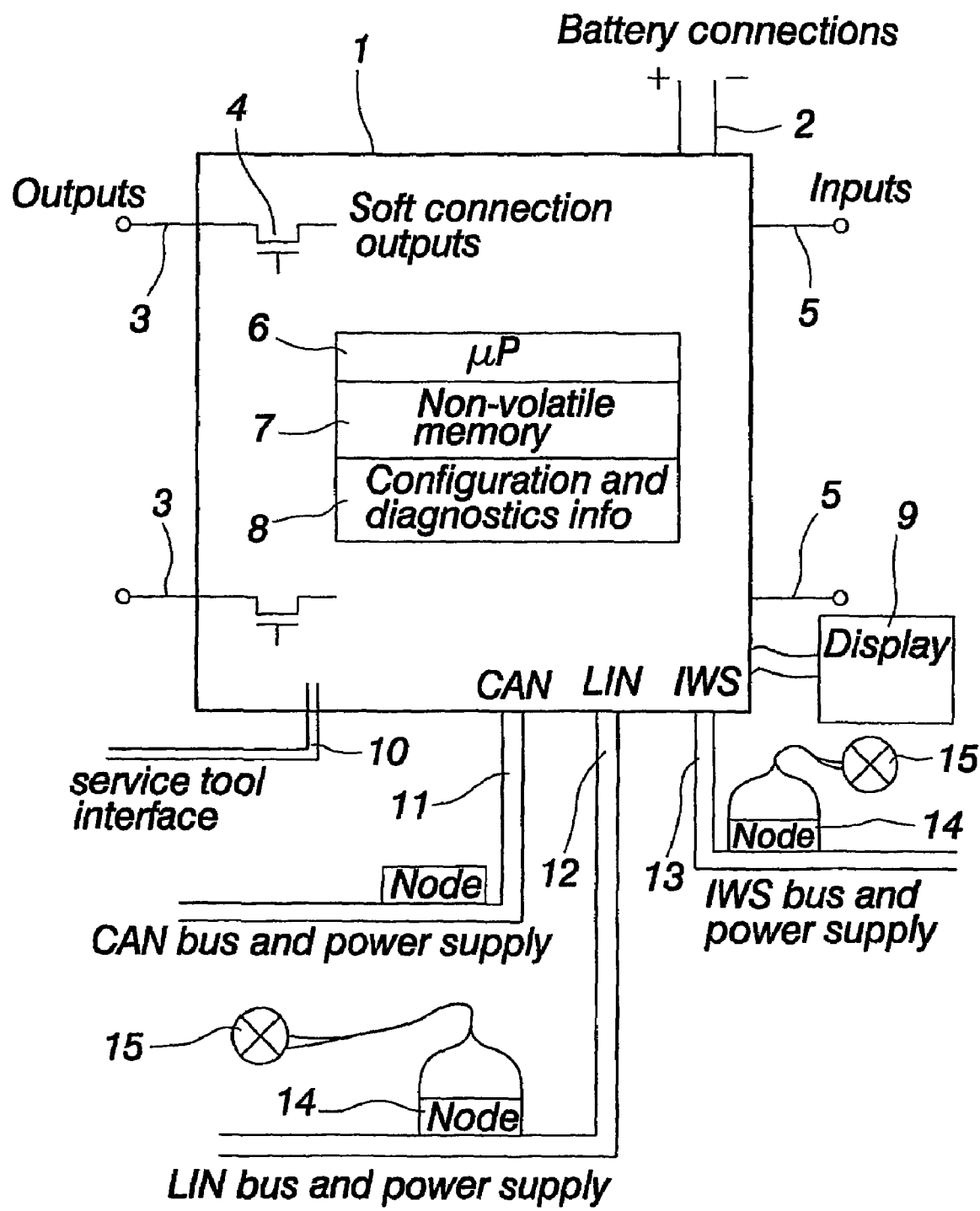

INTELLIGENT FUSE BOX FOR THE POWER DISTRIBUTION SYSTEM OF A VEHICLE

The present invention relates to an intelligent fuse box for a vehicle's multiplex power distribution system, whereby the fuse box includes outputs for supplying the vehicle's functional components/actuators and/or cable buses equipped with intelligent nodes, that latter in turn having outputs for driving functional components/actuators, and further includes means serving fuse functions between the outputs and the vehicle's power supply bus.

Known from patent publication EP 529,650 is a vehicle's multiplex power distribution system, wherein the outgoing buses from the supply power distribution point to intelligent nodes are individually protected by fuses that provide protection against both overcurrent and short-circuit situations. These fuses are not implemented using solid-state switches.

Known from U.S. Pat. No 4,575,673 is a vehicle's multiplex power distribution system, whose intelligent nodes include electronic means for monitoring the load current and switching off the vehicle power to the load if a given reference current level is exceeded with a due margin in respect to inrush transients. Instead of being concentrated in a single fuse box of the system, the gated solid-state switches are incorporated in the control modules that are located in a distributed fashion. Hence, the system disclosed in U.S. Pat. No. 4,575,673 needs a separate (conventional) fuse box between the vehicle power supply and the bus outputs for protecting the buses and the intelligent nodes located along the buses.

It is an object of the present invention to provide an intelligent fuse box of the above-described kind that is suited for use as an intermediate unit between the primary power supply and a vehicle's multiplex power distribution system.

Conventional fuse boxes are handicapped by plural problems such as:
due to their mechanical or thermal trip function, the fuse elements cannot be adjusted for different overcurrent levels,
the fuse elements are of the slow-blow type, which inherently invokes a fire hazard in a short-circuit or overload situation,
the trip levels of fuse elements are invariably nonprogrammable, whereby it is impossible to meet the need for reducing the trip level of a fuse element in an Asleep state, for instance, without manipulating the mechanical fuse elements,
the fuse element cannot perform any interference filtration, and
last but not least, the life of mechanically tripping protective elements is always limited.

These problems and limitations can be overcome by virtue of an intelligent fuse box according to the invention. Details of preferred embodiments of the invention are described herein.

In the following, the invention will be examined in greater detail with reference to the appended drawings, in which:

FIG. 1 illustrates an intelligent fuse box according to the invention in a block diagram.

DETAILED DESCRIPTION OF THE INVENTION

As illustrated, a fuse box 1 provides outputs 3 for driving functional components/actuators and/or buses 11, 12, 13 having coupled thereon intelligent nodes 14 that have outputs for driving functional components/actuators 15. Thus, the fuse box 1 may in a conventional fashion have outputs 3 separately for each functional component/actuator of the vehicle. Additionally, the fuse box may have coupled thereto one or more buses 11–13 formed by current conductors complemented with data conductors over which information is transmitted using some standardized data transmission protocol (CAN, LIN or IWS). Herein, CAN (Controller Area Network) is a protocol conventionally used by automotive vehicle manufacturers. IWS (Intelligent Wiring System) is a simplified version of the CAN protocol adapted by the applicant. LIN is a master/slave-type protocol. As to the fuse box 1, the above-mentioned buses 11–13 represent a single protected load, whose overcurrent trip level is determined by the summed nominal maximum current of the loads connected to a given cable bus. The overload current monitoring of the loads 15 coupled to the buses 11–13 is performed with the help of intelligent nodes 14.

The overcurrent trip functions are accomplished by means of solid-state switches 4 that are connected between vehicle's power supply 2 and the load outputs 3 or the bus outputs 11–13. In addition to conventional overcurrent trip functions, the switches 4 can be employed to accomplish a number of other flexible functions to be described in more detail later in the text.

The fuse box 1 also includes inputs 5 for receiving control messages steering the ON/OFF state of solid-state switch 4. These control messages are submitted, e.g., from the control levers of turn indicators and windshield wipers, light switches and the like control switches of the dashboard, as well as from the sensors of functional components/actuators.

The invention is characterized in that a microprocessor 6 is employed for controlling solid-state switches 4 on the basis of a memory-stored program utilizing the current limit values of configuration data 8. The configuration data include the limits of a normal current window for each one of outputs 3 or 11–13 and a trip limit that is substantially higher than the upper limit of the normal current window. If the load current falls below the lower limit of the normal current window, a fault alarm is issued to a display 9. Respectively, if the upper limit of the normal current window is exceeded, the current drive is temporarily cut off and, based on the configuration data 8, the program stored in memory 7 decides whether to continue or not driving the load. However, if the trip limit of output current is exceeded, the switch 4 is invariably set into the OFF state in order to cut off the drive current to the load.

The current monitoring functions for both the normal current window and the trip limit are based on measuring the voltage over the solid-state switch 4 and/or the load, whereby the measurement value Is compared with a reference value of the respective memory-stored current limit in the configuration data. This comparison may be performed using, e.g., a control circuit described in international patent application WO 00/69043 that serves a dual function in eliminating voltage and current transients occurring at either drive turn-on or turn-off. As generally known, turning on the load drive switches 4 involves a rush current transient that now can be eliminated by virtue of the intelligent fuse box according to the invention. More specifically, proper control of the switch 4 makes it possible to inhibit a transient overcurrent peak or, alternatively, allow a short-duration overcurrent peak at a current-limited level without tripping the drive to the load at the instant the solid-state switch 4 is controlled from the OFF state to the ON state. As noted above, these current limits are predetermined with the help of the configuration data 8. An additional benefit of the invention is that the configuration data 8 are reprogrammable via a service interface 10.

The facility of controlling the switches 4 in a programmable manner according to the stored configuration data can be further utilized to implement dynamic fuse functions such that, e.g., permit given functional components/actuators and/or cable buses to be driven at a reduced current when the vehicle is parked stationary.

The measurement of the overall current load of the vehicle's multiplex power distribution system can be arranged to take place based on, e.g., the voltage drops over the switches inasmuch these signals are readily obtainable from the overcurrent monitoring of the solid-state switches 4.

The state, current and diagnostic data of the protective element serving as fuses can be stored in the system memory for later service needs and, respectively, the data can be transmitted to a display unit or remote service terminal. An optional bidirectional RF link between the vehicle and a service site is also feasible based on the information stored in the intelligent fuse box.

In addition to the above-described benefits, the invention offers higher system security and reliability, as well as longer life of the vehicle's electronics and functional components/actuators by virtue of the smoother control of load drive power. Moreover, the EMC interference level is reduced.

The physical fuse box that houses the electronics circuitry accomplishing the above-described functions may be designed to have a similar size and dimensions as a conventional fuse box, whereby the adoption of the novel fuse box does not dictate a redesign of the vehicle's wiring system.

What is claimed is:

1. An intelligent fuse box (1) for a vehicle's multiplex power distribution system, comprising:
    a power source provided with vehicle's power supply bus (2), the fuse box (1) being connected with the power supply bus (2),
    at least one cable bus (11–13) between the fuse box (1) and vehicle's functional components/actuators, said at least one cable bus (11–13) being equipped with intelligent nodes (14) which in turn have outputs for driving the functional components/actuators, each of the at least one cable bus (11–13) further having a power source end connected to an output of the fuse box (1),
    the fuse box including outputs (3) for the vehicle's functional components/actuators and outputs connected to the power source ends of the cable buses (11–13), and further including means serving fuse functions between the outputs of the fuse box and the vehicle's power supply bus (2), and said fuse box (1) further includes inputs (5) for receiving messages controlling the ON/OFF state of solid-state switches (4), configuration data (8) including the limits of a normal current window for the outputs of the fuse box, and a microprocessor (6), the microprocessor (6) controlling the solid-state switches (4) based on a program stored in the microprocessor memory (7) and on the current limits predetermined in the configuration data (8), the configuration data (8) contributing under external control for altering the current limits,
    wherein the configuration data (8) are reprogrammable via a service interface (10) for altering the predetermined current limits.

2. The fuse box of claim 1, wherein the current-limiting function of the fusebox is made controllable based on comparing the voltage measured over said solid-state switch (4) and/or the load with a respective voltage value of the configuration data which are stored in the memory (8) and corresponds to the desired current limit.

3. The fuse box of claim 1, wherein said solid-state switches (4) comprise a turn-on control that is complemented with a current-limiting function known as soft connection that is capable of inhibiting a transient overcurrent peak or, alternatively, allowing a short-duration overcurrent peak at a current-limited level without tripping the drive to the load at the instant the solid-state switch (4) is controlled from the OFF state to the ON state.

4. The fuse box of claim 1, wherein said means serving fuse functions comprise controlled solid-state switches (4).

5. The fuse box of claim 1, wherein the current limits include the limits of a normal current window with a lower limit and an upper limit whereby violation of the lower limit triggers a fault message while violation of the upper limit causes the load current drive to be temporarily cut off for a time interval predetermined in the configuration data, and wherein in the configuration data is also stored a trip current limit which is substantially higher than the upper limit of the normal current window and at which the load current drive is permanently cut off.

6. The fuse box of claim 1, wherein said solid-state switches (4) are controlled to drive given functional components/actuators and/or cable buses at a reduced current when the vehicle is parked stationary.

7. The fuse box of claim 1, wherein the overall load current measurement of the vehicle's multiplex power distribution system is arranged to take place based on voltage drops over the solid-state switches that are sensed to control the switches in their fuse function.

* * * * *